Patented Oct. 17, 1922.

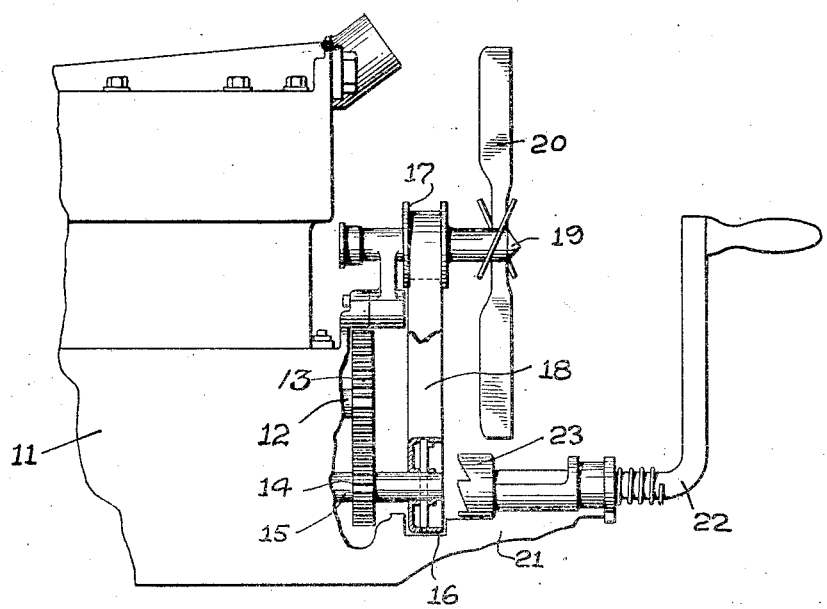
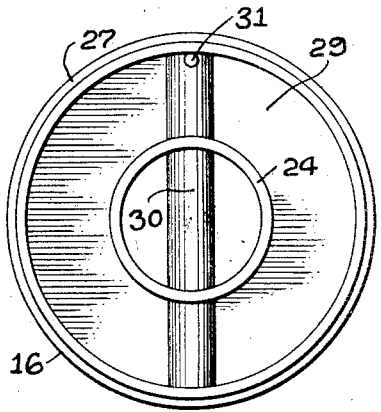
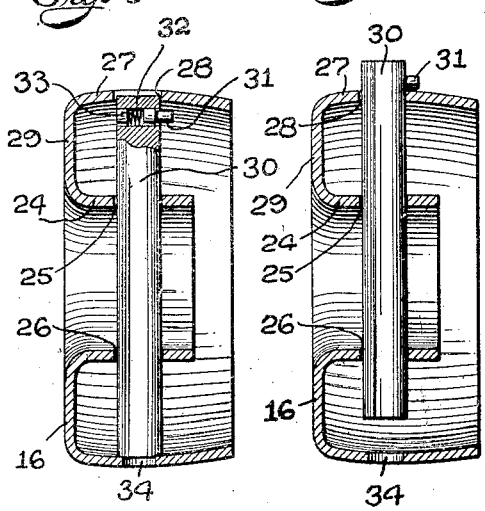
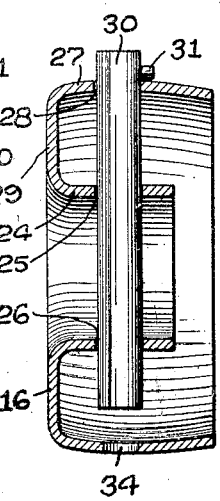

1,432,581

UNITED STATES PATENT OFFICE.

OTIS HENRY WALKER AND JOHN DANIEL VOGT, OF CHATTANOOGA, TENNESSEE.

FAN PULLEY.

Application filed July 8, 1919. Serial No. 309,371.

*To all whom it may concern:*

Be it known that we, OTIS H. WALKER and JOHN D. VOGT, citizens of the United States, and residents of the city of Chattanooga, State of Tennessee, have invented an Improvement in Fan Pulleys, of which the following is a specification.

This invention relates to means for securing bodies to shafting, and more particularly for securing the fan pulley of an automobile to the crank shaft thereof.

The principal object of the invention is to provide a securing device of this character which will be of generally improved construction, more readily detachable, and more satisfactory in operation. Other objects of the invention will be apparent from a consideration of the description which follows.

In the drawings which form a part of this specification,

Figure 1 is a general view of certain parts of the mechanism of an automobile showing, for illustration, a form of fan pulley which is constructed according to this invention;

Figure 2 is a front elevation of the fan pulley and securing device of Figure 1;

Figure 3 is a vertical section of the pulley of Figure 2; while

Figure 4 is a view similar to Figure 3 showing the securing pin only partially in position.

In these drawings there is represented at 11 an engine of a well known type provided with a forwardly extending shaft 12 carrying a gear 13 meshing with a cooperating gear 14 carried by the shaft 15, which also carries the fan pulley 16. Passing around this fan pulley 16 and cooperating pulley 17 is the fan belt 18. The pulley 17 is mounted on shaft 19 to which is also secured the fan 20. Mounted in a bracket 21, which extends forwardly from a frame 11, is a hand crank 22 provided at its rear end with a ratchet 23 adapted to engage with cooperating parts of the fan pulley to transmit rotation from the hand shaft 22 to the shaft 15.

The fan pulley 16 is necessarily provided with suitable means for securing it to the shaft 15 and may also be provided with means to cooperate with the ratchet 23. These means may comprise the construction which is disclosed in the drawings. This construction employs a fan pulley having a hub 24, which is provided with two apertures 25 and 26, preferably diametrically opposed, and a rim 27 provided with an aperture 28 alined with the apertures 25 and 26 in the hub 24. The hub 24 and rim 27 are connected by any suitable means such as a flange 29, integral with both the hub and the flange, and where this construction is employed the entire pulley member may be stamped from one sheet of metal.

In order to secure the pulley to the shaft there is provided a pin 30 of proper diameter to slide through the apertures 25, 26, and 28, and also pass through a suitable aperture in the shaft to which the fan pulley is secured. This pin 30 abuts at one end against the under-side of the pulley rim 27 and is secured from movement in that direction in that manner. It is necessary to provide suitable securing means to prevent motion of the pin in the reverse direction and such means may comprise a spring pressed detent 31 slidably carried in the recess 32 of the pin 30 and spring pressed outwardly by a suitable spring 33.

When the pulley 16 is to be assembled on the shaft 15 it is slipped on to the shaft in a proper position and the pin 30 is then inserted through the apertures in the rim, hub, and shaft into the position shown in Figure 4, where free motion is arrested by the engagement of the detent 31 with the exterior of the rim 27. The detent 31 is then pressed inwardly whereupon the pin 30 is free to slide into final position, after which the detent 31 snaps back into extended position beneath the rim 27 to thus prevent withdrawal or removal of the pin 30 until the detent 31 is manually depressed.

This same pin 30 may preferably be constructed of such material and dimensions that it may be engaged directly by the ratchet 23 to transmit motion from the ratchet to the shaft 15. This construction is clearly disclosed in Figure 1 and results in the elimination of additional parts.

The fan pulley 16 may preferably be provided with an aperture 34 alined with the apertures 25, 26, and 28, and accordingly positioned beneath the pin 30 when the pin is in assembled position. A suitable tool may be inserted through this aperture 34 to engage the end of the pin 30 to facilitate the removal of the pin.

It will be apparent from the above description that we have provided a fan pulley of generally improved construction, and in particular that we have provided this fan pulley with improved means for securing it to the shaft and for receiving and transmitting the motion of the hand crank ratchet. We realize that various modifications and changes may be made in the construction herein disclosed without departing from the scope of our invention and we also realize that there are advantages in our construction other than those specifically pointed out. So far as these changes, modifications, and other advantages are included within the scope of the appended claims, they are, therefore, to be considered as part of our invention.

We claim:

1. In combination, a body having a hub provided with opposed apertures and a rim provided with an aperture in alinement with said hub apertures, a pin adapted to be passed through said apertures and through a cooperating aperture in the shaft on which said hub is carried and adapted to be engaged by a ratchet to permit said ratchet to rotate said body, and a spring pressed detent slidably mounted in said pin to project laterally therefrom to engage beneath said rim to hold said pin in position.

2. In combination, a pulley having a hub provided with opposed apertures and a rim provided with an aperture in alinement with said hub apertures, a pin adapted to be passed through said apertures and through a cooperating aperture in the shaft on which said hub is carried and adapted to be engaged by a ratchet to thus enable said ratchet to rotate said pulley, and a spring pressed detent slidably mounted in said pin to project laterally therefrom to engage beneath said rim to hold said pin in position.

3. In combination, a body having a hub provided with opposed apertures and a rim provided with an aperture in alinement with said hub apertures, a pin adapted to be passed through said apertures and through a cooperative aperture in the shaft on which said hub is carried, and a spring pressed detent slidably mounted in said pin to project laterally therefrom to engage beneath said rim to hold said pin in position.

OTIS HENRY WALKER.
JOHN DANIEL VOGT.